(12) United States Patent
Liverato et al.

(10) Patent No.: US 11,585,384 B2
(45) Date of Patent: Feb. 21, 2023

(54) BEARING RING WITH INTEGRATED FIBER SENSOR AND ASSOCIATED BEARING

(71) Applicant: Aktiebolaget SKF, Gothenburg (SE)

(72) Inventors: Yves-André Liverato, Saint Paterne Racan (FR); Olivier Verbe, Tours (FR)

(73) Assignee: Aktiebolaget SKF, Gothenburg (SE)

( * ) Notice: Subject to any disclaimer, the term of this patent is extended or adjusted under 35 U.S.C. 154(b) by 0 days.

(21) Appl. No.: 17/359,784

(22) Filed: Jun. 28, 2021

(65) Prior Publication Data

US 2022/0010840 A1 Jan. 13, 2022

(30) Foreign Application Priority Data

Jul. 7, 2020 (DE) .................. 102020208508.0

(51) Int. Cl.
| | |
|---|---|
| *F16C 19/52* | (2006.01) |
| *F16C 41/00* | (2006.01) |
| *F16C 19/16* | (2006.01) |
| *G01M 13/045* | (2019.01) |

(52) U.S. Cl.
CPC .......... *F16C 41/007* (2013.01); *F16C 19/16* (2013.01); *F16C 19/522* (2013.01); *F16C 19/527* (2013.01); *G01M 13/045* (2013.01); *F16C 2233/00* (2013.01)

(58) Field of Classification Search
CPC ........ F16C 19/06; F16C 19/16; F16C 19/522; F16C 41/007; F16C 2233/00; F16C 19/527; G01L 5/0009; G01M 13/045
See application file for complete search history.

(56) References Cited

U.S. PATENT DOCUMENTS

| | | | | |
|---|---|---|---|---|
| 6,948,856 B2* | 9/2005 | Takizawa | ............. | F16C 33/586 |
| | | | | 384/448 |
| 8,790,013 B2* | 7/2014 | Reedman | ............. | G01M 13/04 |
| | | | | 384/448 |
| 9,546,689 B2* | 1/2017 | Yang | .................... | C03C 27/046 |
| 10,113,585 B2* | 10/2018 | van Genuchten | ..... | F16C 33/583 |
| 2010/0158434 A1* | 6/2010 | Becker | ................. | G02B 6/4204 |
| | | | | 385/13 |
| 2015/0323013 A1* | 11/2015 | Herdier | ................. | G01M 13/04 |
| | | | | 384/448 |
| 2020/0063794 A1 | 2/2020 | Lang et al. | | |

FOREIGN PATENT DOCUMENTS

| | | | | |
|---|---|---|---|---|
| DE | 102015208444 A1 | 12/2016 | | |
| DE | 102017217813 A1 | 4/2019 | | |
| EP | 2507603 B1 | 3/2018 | | |
| WO | WO-2014090324 A1 * | 6/2014 | ............ | F16C 19/522 |
| WO | WO-2014108170 A1 * | 7/2014 | ............ | F16C 19/522 |
| WO | 2016/096031 A1 | 6/2016 | | |

* cited by examiner

*Primary Examiner* — Phillip A Johnson
(74) *Attorney, Agent, or Firm* — Garcia-Zamor Intellectual Property Law; Ruy Garcia-Zamor; Bryan Peckjian

(57) ABSTRACT

A bearing ring having a main part ring provided with at least one groove formed a surface of the main part ring. The bearing ring further provides at least one fiber sensor mounted inside the groove. The bearing ring also include at least one counterpart ring mounted into the groove of the main part ring and coming into contact with the fiber sensor to maintain the fiber sensor against a groove bottom, the counterpart ring being secured to the main part ring.

20 Claims, 6 Drawing Sheets

BEARING RING WITH INTEGRATED FIBER SENSOR AND ASSOCIATED BEARING

CROSS REFERENCE TO RELATED APPLICATIONS

This application claims priority to German Patent Application no. 102020208508.0, filed Jul. 7, 2020, the contents of which is fully incorporated herein by reference.

TECHNICAL FIELD OF THE INVENTION

The present invention relates to condition monitoring of bearings, notably the load sensing. More precisely, the present invention relates to a bearing with integrated fiber sensor, notably optical fiber sensor.

BACKGROUND OF THE INVENTION

In order to estimate bearing loads acting on a bearing, it is known to integrate strain sensors onto the fixed stationary ring of the bearing.

In order to be able to measure different parameters and to monitor the condition of a bearing in a reliable manner without any electrical power locally at the bearing, it is also known to use optical fiber sensors. For example, it is possible to refer to the patent EP-B1-2 507 603 (SKF).

Such optical fiber sensors may be disposed in circumferential grooves formed on the outer surface of the non-rotating outer ring.

Classically, the assembly of the optical fiber sensors on the outer ring uses gluing to fix the optical fiber sensors and potting to embed and seal these fiber sensors.

Such an assembly is very long and meticulous. As a matter of fact, this needs a curing of the glue and potting material. Besides, before curing, meticulous operations have to be achieved to handle optical fiber sensors that are fragile combined with liquid glue and potting materials.

One aim of the present invention is to overcome these drawbacks.

SUMMARY OF THE INVENTION

The invention relates to a bearing ring comprising a main part ring provided with at least one groove formed on a surface of the main part ring.

The bearing ring also comprises at least one fiber sensor mounted inside the groove. The bearing ring further comprises at least one counterpart ring mounted into the groove of the main part ring and coming into contact with the fiber sensor to maintain the fiber sensor against the groove bottom. The counterpart ring is secured to the main part ring.

Thanks to the invention, the fiber sensor is positioned and maintained inside the groove by the solid counterpart ring. With such design, the assembly operations are simplified. The counterpart ring has also a sealing function. There is no need of liquid potting material needing a curing.

Preferably, the counterpart ring may be removably secured to the main part ring. Accordingly, the counterpart ring may be removed and then reinstalled in case of inspection or replacement of the fiber sensor for example.

In one particular embodiment, the groove of the main part ring has a V-shaped cross-section, the counterpart ring being provided with two opposed frustoconical frontal faces each coming into contact with one of the sidewalls of the groove. Alternatively, the groove may have other shapes in cross-section, for example a rectangular or a square shape.

Preferably, the counterpart ring is made of a more flexible material than that of the main part ring. Hence, the sealing function of the counterpart ring is improved. For example, the counterpart ring may be made of synthetic material, such as nitrile, or natural or synthetic rubber, or thermoplastic elastomer (TPE).

In one embodiment, the fiber sensor may comprise a plurality of sensing parts spaced apart from each other in the circumferential direction. For example, the fiber sensor may be an optical fiber sensor, such as a Bragg grated optical fiber. Alternatively, the fiber sensor may be other type of glass fiber.

In one embodiment, the counterpart ring may comprise abutting sections coming into contact against the sensing parts of the fiber sensor, and hollow sections provided between the abutting sections and which remain spaced apart from the fiber sensor.

In one embodiment, the counterpart ring radially protrudes with respect to the surface of the main part ring. Alternatively, the counterpart ring may be radially offset inwards, or may be flush, with respect to the surface.

In one embodiment, the counterpart ring may be provided with clipping ribs extending into slots provided on the sidewalls of the groove of the main part ring.

In one embodiment, the bearing ring further comprises at least one electronic component and/or at least one magnet embedded inside the counterpart ring.

The counterpart ring may also be used for marking information related to the bearing ring, such as alphanumerical, bare code, data matrix for example.

In one embodiment, the surface of the main part ring may extend axially. In this case, the groove may open in a radial direction.

Alternatively, the surface of the main part ring may extend radially. In this case, the groove may open in an axial direction.

The main part ring may be provided with an inner bore, with an outer surface and with two side faces axially delimiting the bore and the outer surface.

The inner bore and/or the outer surface of the main part ring may have a cylindrical shape with one single diameter. Alternatively, the inner bore and/or the outer surface may have a stepped shape with at least two diameters.

At least one of the side faces of the main part ring may have a flat shape. Alternatively, at least one of the side faces may have a stepped shape.

In one embodiment, the groove is formed on one of the inner bore and outer surface.

In another embodiment, the groove is formed on one of the side faces.

The invention also relates to a method for manufacturing a bearing ring as previously defined comprising the following steps:

introducing the counterpart ring into the groove of the main part ring, and mechanically securing the counterpart ring to the main part ring.

The invention further relates to a bearing comprising first and second rings capable of rotating concentrically relative to one another, at least one of the rings being formed of the bearing ring as previously defined.

The bearing may further comprise at least one row of rolling elements disposed between raceways of the inner and outer rings. The raceway of the at least one of the inner and outer rings is formed on the main part ring.

BRIEF DESCRIPTION OF THE DRAWINGS

The present invention and its advantages will be better understood by studying the detailed description of specific embodiments given by way of non-limiting examples and illustrated by the appended drawings on which.

DETAILED DESCRIPTION OF THE INVENTION

Figure 1:
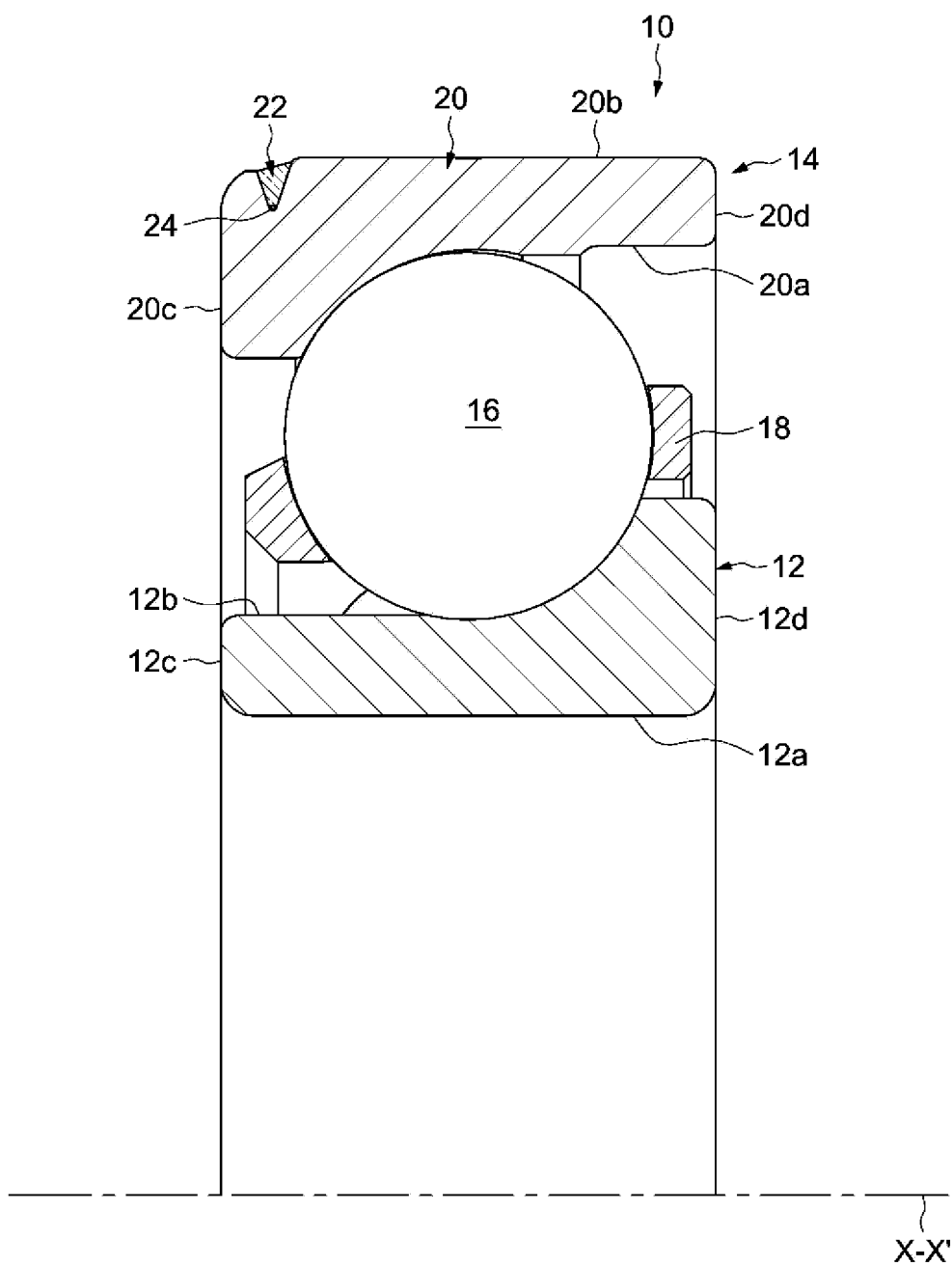
FIG. 1 is an axial section view of a rolling bearing according to an example of the invention.

The rolling bearing 10 as illustrated on FIG. 1 comprises an inner ring 12 and an outer ring 14. The inner and outer rings 12, 14 are concentric and extend axially along the bearing rotation axis X-X' which runs in an axial direction.

In the illustrated example, the rolling bearing 10 also comprises a row of rolling elements 16, which are provided here in the form of balls, interposed between raceways (not referenced) formed on the inner and outer rings 12, 14. The rolling bearing 10 also comprises a cage 18 for maintaining the regular circumferential spacing of the rolling elements 16.

The inner ring 12 comprises a cylindrical inner surface or bore 12a and an outer cylindrical surface 12b which is radially opposite to the bore 12a and from which the raceway for the rolling elements 16 is formed, the raceway being directed radially outwards. The inner ring 12 further comprises two opposite radial side faces 12c, 12d which axially delimit the bore 12a and the outer surface 12b of the ring.

The outer ring 14 comprises a solid main part ring 20 and a solid counterpart ring 22 made separately from the main part ring 20 and secured thereto. The outer ring 14 further comprises an optical fiber sensor 24 radially provided between the main part ring 20 and the counterpart ring 22.

The main part ring 20 of the outer ring may be made of metal. The main part ring 20 comprises a cylindrical inner bore 20a from which the raceway for the rolling elements 16 is formed, the raceway being directed radially inwards. The main part ring 20 also comprises a cylindrical outer surface 20b which is opposite to the inner bore 20a with regard to the radial direction. The main part ring 20 further comprises two opposite radial side faces 20c, 20d which axially delimit the bore 20a and the outer surface 20b of the ring.

Figure 2:
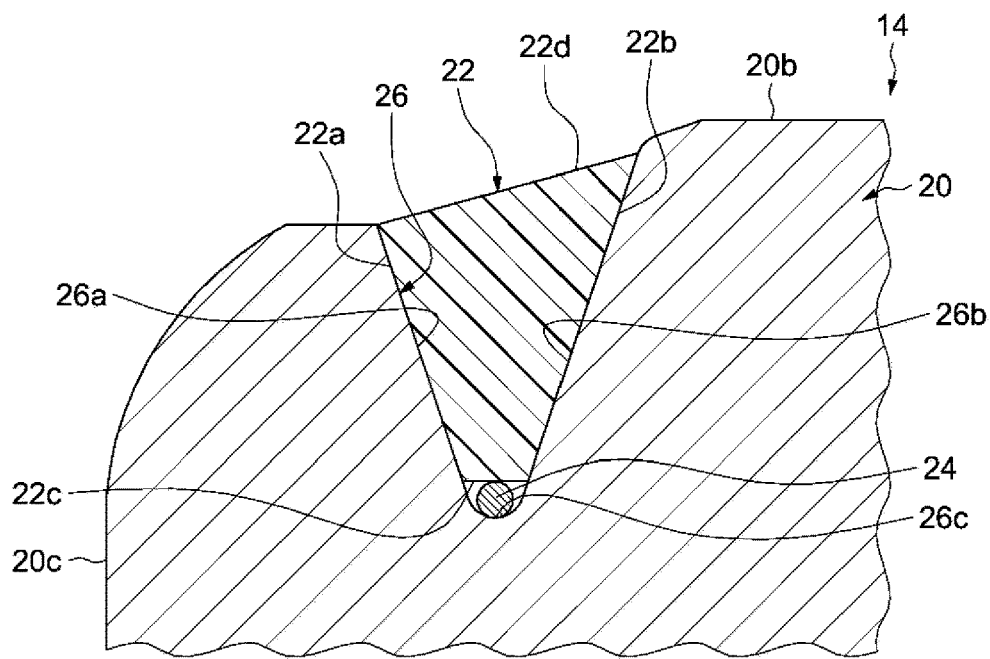
FIG. 2 is a detail view of FIG. 1, and FIGS. 3 to 7 are detail views of a rolling bearing according to other examples of the invention.

As shown more clearly on FIG. 2, a circumferential groove 26 is formed on the outer surface 20c of the main part ring. The optical fiber sensor 24 is mounted inside the groove 26.

The optical fiber sensor 24 extends circumferentially inside the groove 26. The groove 26 is directed radially outwards. The groove 26 extends radially inwards from the outer surface 20c. The circumferential groove 26 may have an annular form. Alternatively, the circumferential groove 26 may be not annular. For example, the grooves 26 may extend over an angular sector less than equal to 340°.

The groove 26 is axially disposed on the outer surface 20c of the main part ring in order to be located on the line (not shown) joining the points of contact of the rolling element 16 and the inner and outer raceways in the radial plane, along which the load may be transmitted from one raceway to another. In the illustrated example, the groove 26 is axially located at the vicinity of the side face 20c.

The groove 26 is axially delimited by two annular side walls 26a, 26b. In this example, the groove 26 has a V-shaped cross-section. The side walls 26a, 26b of the groove extend obliquely. The groove 26 also comprises an annular bottom 26c connected to the side walls 26a, 26b. In the illustrated example, the bottom 26c has a toroidal shape. Alternatively, the bottom 26c may have other shapes, for example a cylindrical shape. In another variant, the bottom 26c may be formed by the edge connecting the side walls 26a, 26b. The cylindrical surface 20c of the main part ring and the bottom 26c of the groove are radially offset.

The counterpart ring 22 is mounted into the groove 26 of the main part ring. The groove 26 is closed by the counterpart ring 22. The counterpart ring 22 is mounted in contact with the side walls 26a, 26b of the groove and is of complementary form. The counterpart ring 22 comprises two opposite frustoconical side faces 22a, 22b which respectively bear against the side walls 26a, 26b of the groove.

The counterpart ring 22 also comprises a cylindrical inner surface or bore 22c and an outer cylindrical surface 22d which is radially opposite to the bore. The bore 22c and the outer surface 22d are axially delimited by the side faces 22a, 22b.

The optical fiber sensor 24 is radially located between the groove 26 of the main part ring and the counterpart ring 22. More precisely, the optical fiber sensor 24 is radially located between the groove bottom 26c and the bore 22c of the counterpart ring.

The optical fiber sensor 24 comprises a plurality of sensing parts spaced apart from each other in the circumferential direction. Each sensing part may be a light distorting structure which could be fiber Bragg grating for example. For more detail concerning such optical fiber sensors, it is possible for example to refer to the patent EP-B1-2 802 796 (SKF). The optical fiber sensor 24 may be used to measure different parameters of the rolling bearing 10, for example loads, temperatures, pressures, vibrations, etc.

The counterpart ring 22 radially comes into contact with the optical fiber sensor 24. The counterpart ring 22 maintains the optical fiber sensor 24 in contact against the bottom 26c of the groove. The bore 22c of the counterpart ring radially comes into contact with the optical fiber sensor 24. The bore 22c may come into contact with the optical fiber sensor 24 over 360°.

Alternatively, the bore 22c may be provided with a plurality of notches 21 spaced apart from each other in the circumferential direction. In this case, the notches 21 form hollow sections remaining spaced apart from the optical fiber sensor 24. The rest of the bore 22c delimits abutting sections in contact with the optical fiber sensor 24, each abutting section being located between two successive hollow sections. The abutting sections of the counterpart ring 22 come into contact against the sensing parts 24a of the optical fiber sensor 24.

The counterpart ring 22 is made of a more flexible material than that of the main part ring 20. For example, the counterpart ring 22 may be made of synthetic material, such as nitrile, or natural or synthetic rubber, or thermoplastic elastomer (TPE). The counterpart ring 22 may be secured to the main part ring 20 by any appropriate means, for example by gluing, press-fitting, welding, soldering or adhesive bonding, with a snap-ring, etc.

The counterpart ring 22 is segmented and is formed into a plurality of successive circumferential ring segments so that is can be mounted inside the groove 26. In this example, in the mounted position, the ring segments of the counterpart ring 22 abut in the circumferential direction. The counterpart ring 22 has an annular form. Alternatively, the counterpart ring 22 may be made in one piece. In this case, an assembly tool is used to expand the counterpart ring 22 just above the outer diameter of the groove 26. The counterpart ring material is selected to stay in elastic deformation range.

Figure 3:
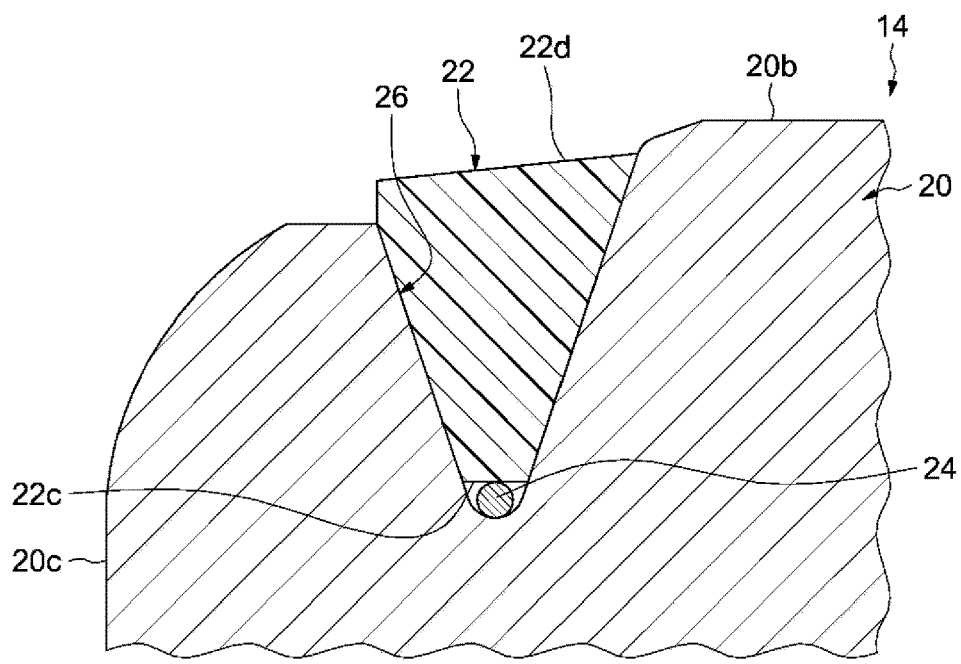

The example shown on FIG. 3, in which identical parts are given identical references, only differs from the previous example in that the bore 22c of the counterpart ring is designed to recover the major part of the optical fiber sensor 24.

Figure 4:
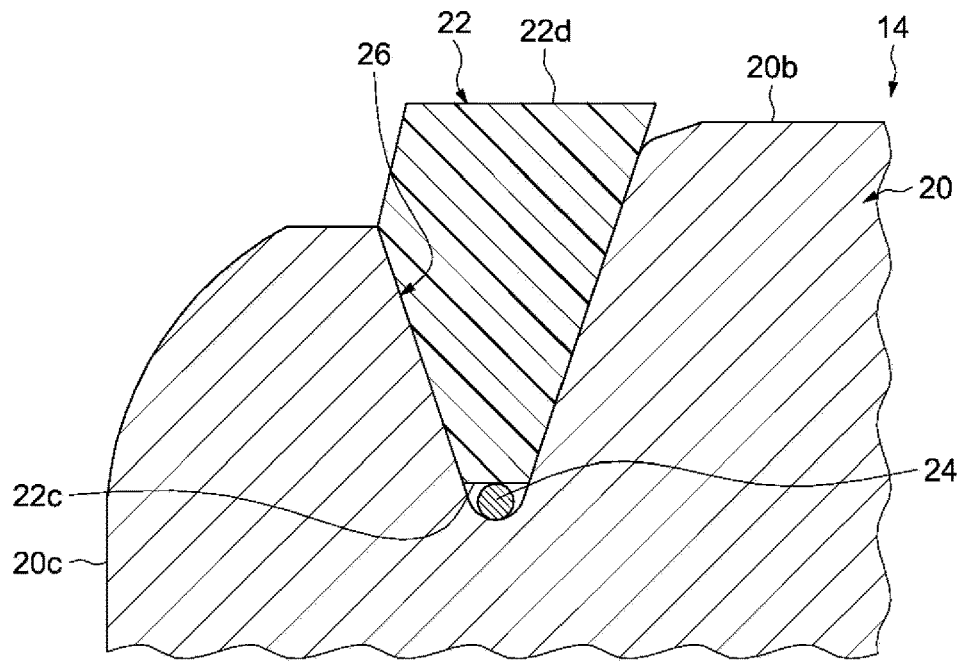

In these previous examples, the outer surface 22d of the counterpart ring is radially offset inwards with respect to the outer surface 20b of the main part ring of the outer ring. Alternatively, the outer surface 22d of the counterpart ring may protrude radially outwards with respect to the outer surface 20b of the main part ring as shown in FIG. 4. In this case, the counterpart ring 22 acts as anti-rotations means with respect to an associated housing (not shown) inside which the outer ring 14 is intended to be mounted. In a free state, the outer diameter of the counterpart ring 22 is larger than the outer diameter of the main part ring 20.

Figure 5:
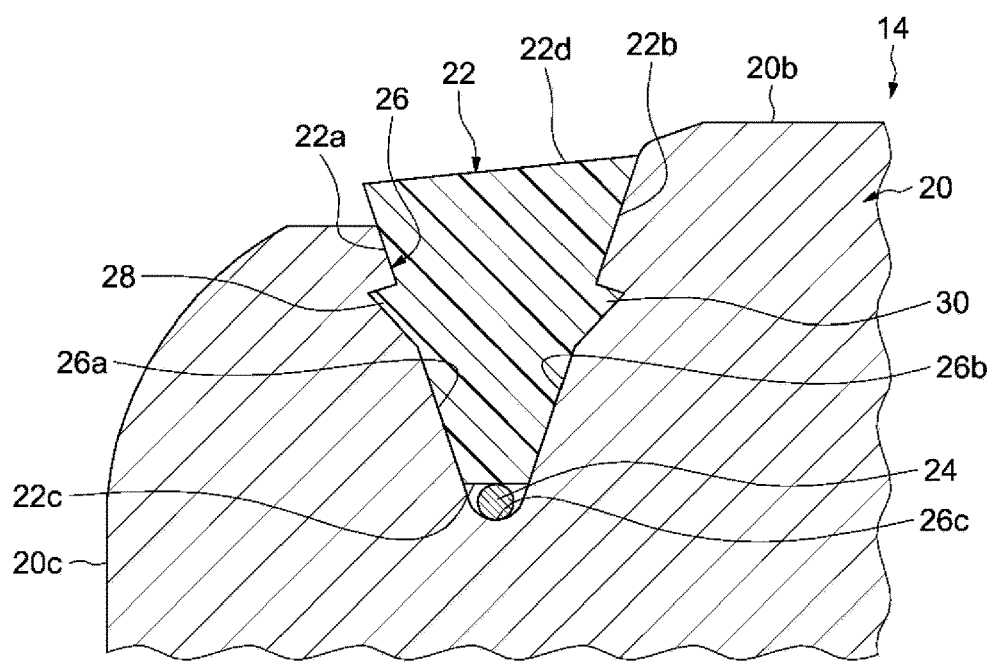

The example shown on FIG. 5, in which identical parts are given identical references, differs from the first example in that each side face 22a, 22b of the counterpart ring is provided with an axial clipping 28, 30 extending into a slot (not referenced) formed on the associated sidewall 26a, 26b of the groove of the main part ring of the outer ring. Accordingly, the counterpart ring 22 is removably secured to the main part ring 20.

Figure 6:
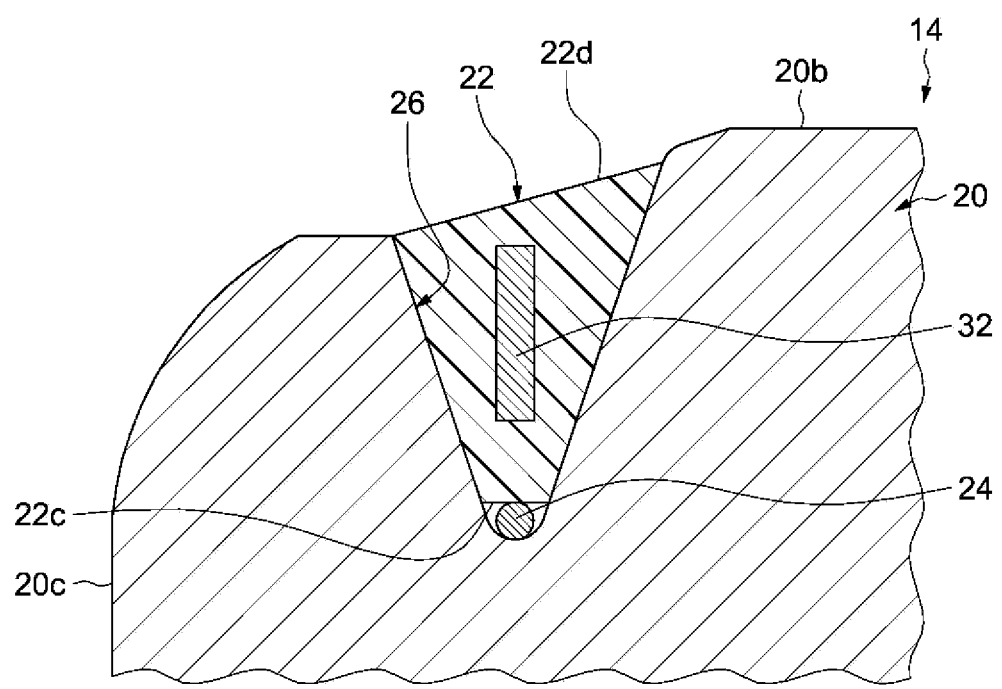

The example shown on FIG. 6, in which identical parts are given identical references, differs from the first example in that an electronic component 32 is embedded inside the counterpart ring 22. The electronic component 32 may be used for example for wired or wireless communication with electronics located remotely, for identification of the rolling bearing, for monitoring parameters of the rolling bearing such as temperature, vibration, speed, . . . , to store rolling bearing individual data.

Alternatively or in combination, a magnet (not shown) may also be embedded inside the counterpart ring 22. Such magnet may be used to trap metallic particles and keep them away from the raceways of the rolling bearing.

In the examples illustrated on FIGS. 1 to 6, as previously mentioned, the groove 26 is axially disposed on the outer surface 20c of the main part ring in order to be located on the line joining the points of contact of the rolling element 16 and the inner and outer raceways in the radial plane, along which the load may be transmitted from one raceway to another.

Alternatively, according to the contact angle of the rolling bearing 10, the groove 26 may be provided on one of the sides faces 20c, 20d of the main part ring.

Otherwise, in the previous illustrated examples, the optical fiber sensor 24 and the counterpart ring 20 are mounted on the outer ring 14. As an alternative, it could be possible to provide a reversed arrangement with the groove formed on the bore of the inner ring, and with the optical fiber sensor and the counterpart ring mounted inside this inner groove.

Figure 7:
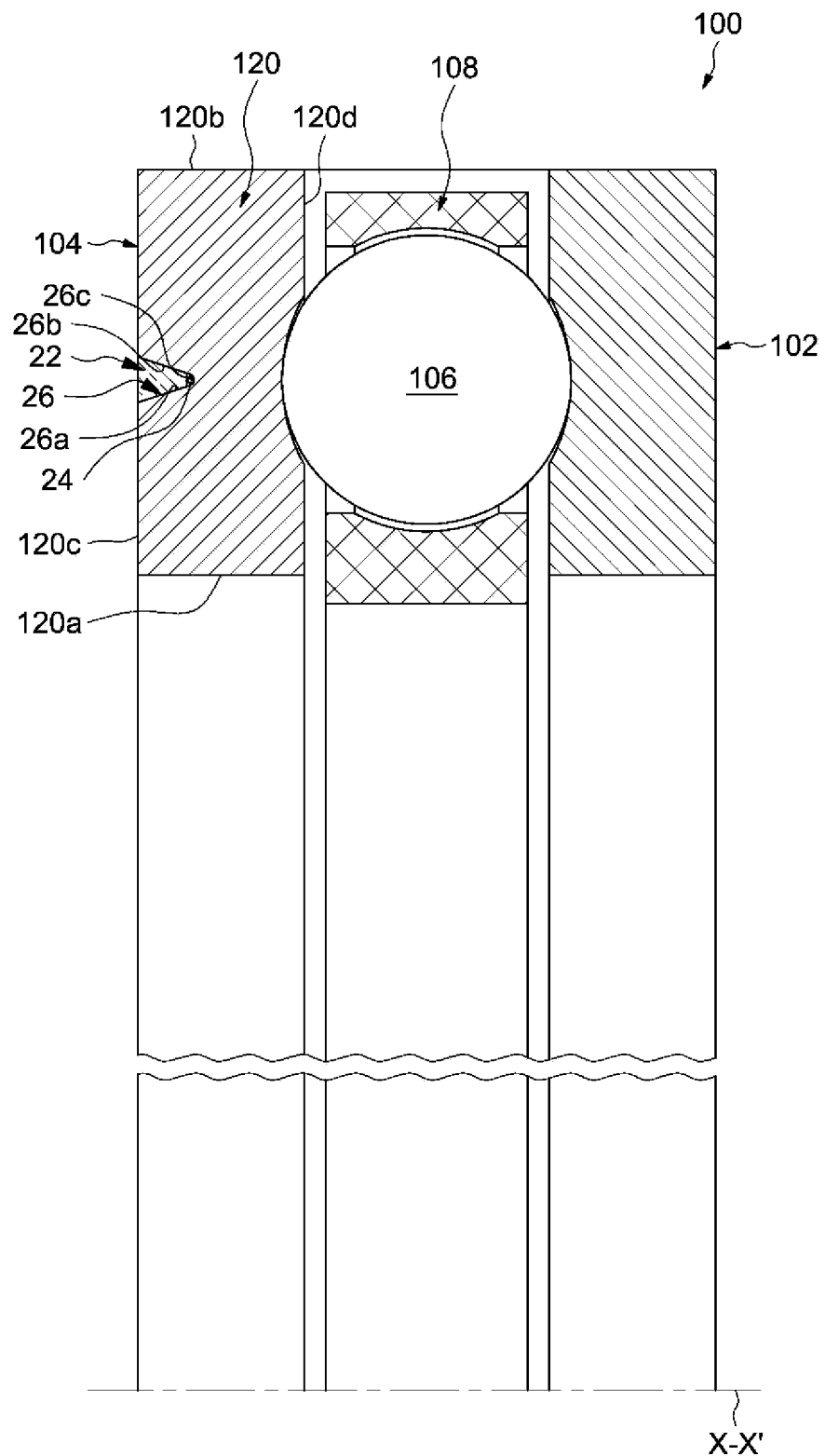
Figure 8:
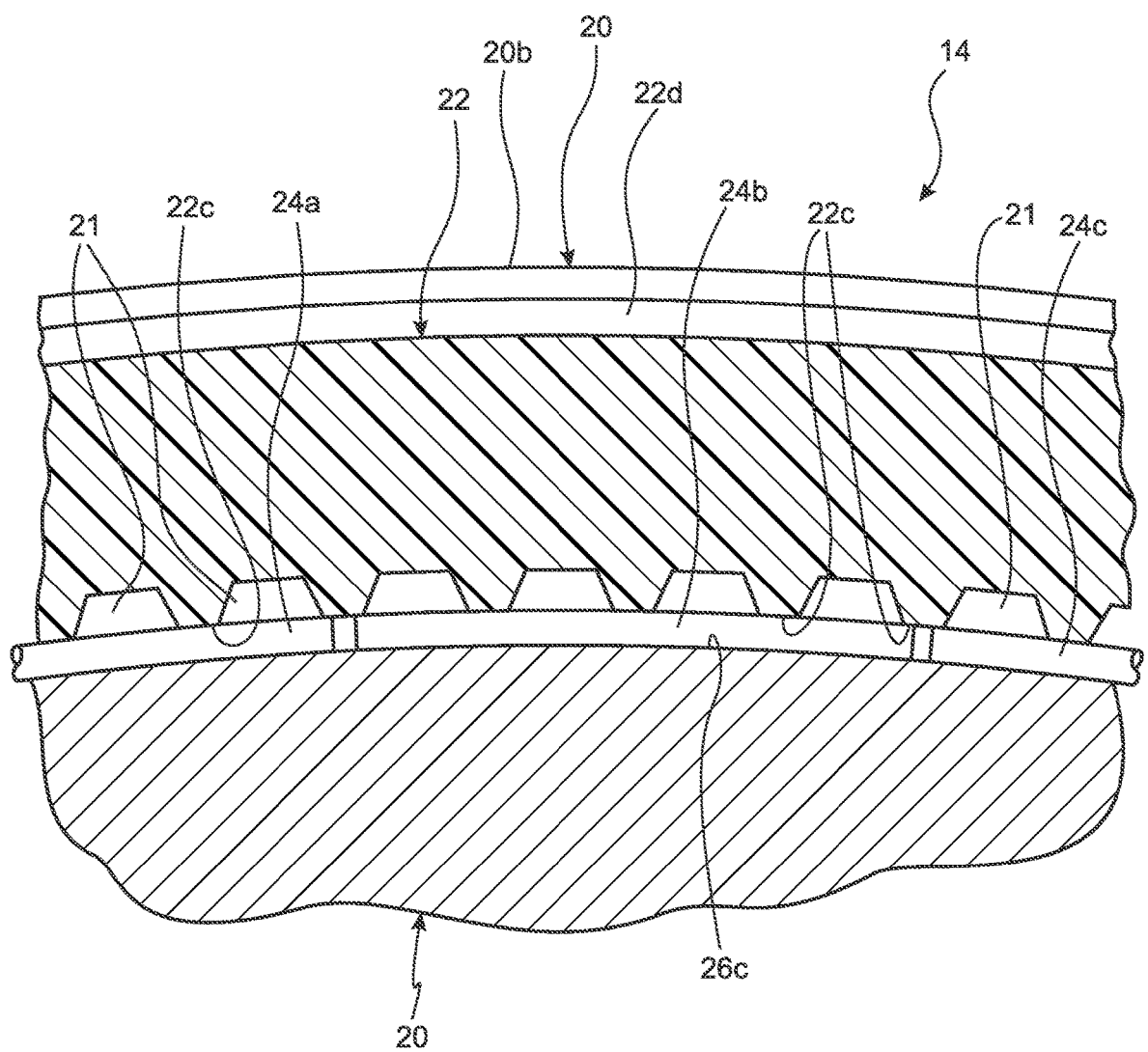

In the examples illustrated on FIGS. 1 to 6, the rolling bearing 10 is an angular contact ball bearing. The invention also applies to other type of rolling bearings adapted to accommodate combined axial and radial loads, or to rolling bearings adapted to accommodate pure radial loads, or to rolling bearings adapted to accommodate pure axial loads for example as shown on FIG. 7.

The rolling bearing 100 as illustrated on FIG. 1 comprises a first ring 102 and a second ring 104. The first and second rings 102, 104 are concentric and extend axially along the bearing rotation axis X-X' which runs in an axial direction.

In the illustrated example, the rolling bearing 100 also comprises a row of rolling elements 106, which are provided here in the form of balls, axially interposed between raceways (not referenced) formed on first and second rings 102, 104. The rolling bearing 100 also comprises a cage 108 for maintaining the regular circumferential spacing of the rolling elements 106 which is axially interposed between the first and second rings 102, 104.

In the illustrated example, the first ring 102 is made in one part. The second ring 104 comprises a solid main part ring 120 and the solid counterpart ring 22 as previously described in the previous examples which is made separately from the main part ring 120 and secured thereto. The second ring 104 further comprises the optical fiber sensor 24 as previously described which is axially provided between the main part ring 120 and the counterpart ring 22.

The main part ring 120 may be made of metal. The main part ring 120 comprises a cylindrical inner bore 120a and a cylindrical outer surface 120b which is opposite to the inner bore 120a with regard to the radial direction. The main part ring 120 further comprises two opposite radial side faces 120c, 120d which axially delimit the bore 120a and the outer surface 120b of the ring. The raceway for the rolling elements 116 is formed on the side face 120d.

In this example, the circumferential groove 26 receiving the optical fiber sensor 24 is formed on the side face 120d. In this example,
the groove 26 is directed axially outwards. The groove 26 extends axially inwards from the side face 120d.

In the illustrated examples, each of the rolling bearings 10, 100 comprises one row of rolling elements. Alternatively, the rolling bearing may comprise at least two rows of rolling elements. In the illustrated examples, the rolling elements are balls. Alternatively, the rolling bearing may comprise other types of rolling elements, for example rollers. In another variant, the bearing may be a sliding bearing having no rolling elements.

The invention claimed is:

1. A bearing ring comprising:
    a main part ring provided with at least one groove formed on a surface of the main part ring,
    at least one fiber sensor mounted inside the groove, and
    at least one counterpart ring mounted into the groove of the main part ring and, when viewed in cross section, tangentially contacting the fiber sensor in order to maintain the fiber sensor against a bottom portion of the groove, the counterpart ring being secured to the main part ring.

2. The bearing ring according to claim 1, wherein the counterpart ring is removably secured to the main part ring.

3. The bearing ring according to claim 1, wherein the counterpart ring is made of a more flexible material than that of the main part ring.

4. The bearing ring according to claim 1, wherein the counterpart ring is provided with clipping ribs extending into slots provided on the sidewalls of the groove of the main part ring.

5. The bearing ring according to claim 1, further comprising at least one electronic component and/or at least one magnet embedded inside the counterpart ring.

6. A bearing ring comprising:
    a main part ring provided with at least one groove formed on a surface of the main part ring,
    at least one fiber sensor mounted inside the groove, and
    at least one counterpart ring mounted into the groove of the main part ring and coming into contact with the fiber sensor in order to maintain the fiber sensor against a bottom portion of the groove, the counterpart ring being secured to the main part ring, wherein the groove of the main part ring has a V-shaped cross-section, the counterpart ring being provided with two opposed frustoconical frontal faces each coming into contact with one of the sidewalls of the groove.

7. The bearing ring according to claim 6, wherein the counterpart ring is removably secured to the main part ring.

8. The bearing ring according to claim 6, wherein the counterpart ring is made of a more flexible material than that of the main part ring.

9. The bearing ring according to claim 6, wherein the counterpart ring is provided with clipping ribs extending into slots provided on the sidewalls of the groove of the main part ring.

10. The bearing ring according to claim 6, further comprising at least one electronic component and/or at least one magnet embedded inside the counterpart ring.

11. A bearing ring comprising:
a main part ring provided with at least one groove formed on a surface of the main part ring,
at least one fiber sensor mounted inside the groove, and
at least one counterpart ring mounted into the groove of the main part ring and coming into contact with the fiber sensor in order to maintain the fiber sensor against a bottom portion of the groove, the counterpart ring being secured to the main part ring, wherein
the fiber sensor comprises a plurality of sensing parts spaced apart from each other in the circumferential direction, the counterpart ring comprising abutting sections coming into contact against the sensing parts of the fiber sensor, and hollow sections provided between the abutting sections which remain spaced apart from the fiber sensor.

12. The bearing ring according to claim 11, wherein the counterpart ring is removably secured to the main part ring.

13. The bearing ring according to claim 11, wherein the counterpart ring is made of a more flexible material than that of the main part ring.

14. The bearing ring according to claim 11, wherein the counterpart ring is provided with clipping ribs extending into slots provided on the sidewalls of the groove of the main part ring.

15. The bearing ring according to claim 11, further comprising at least one electronic component and/or at least one magnet embedded inside the counterpart ring.

16. A bearing ring comprising:
a main part ring provided with at least one groove formed on a surface of the main part ring,
at least one fiber sensor mounted inside the groove, and
at least one counterpart ring mounted into the groove of the main part ring and coming into contact with the fiber sensor in order to maintain the fiber sensor against a bottom portion of the groove, the counterpart ring being secured to the main part ring, wherein
the counterpart ring radially protrudes with respect to the surface of the main part ring.

17. The bearing ring according to claim 16, wherein the counterpart ring is removably secured to the main part ring.

18. The bearing ring according to claim 16, wherein the counterpart ring is made of a more flexible material than that of the main part ring.

19. The bearing ring according to claim 16, wherein the counterpart ring is provided with clipping ribs extending into slots provided on the sidewalls of the groove of the main part ring.

20. The bearing ring according to claim 16, further comprising at least one electronic component and/or at least one magnet embedded inside the counterpart ring.

* * * * *